(12) United States Patent
Winterholler et al.

(10) Patent No.: US 11,378,402 B2
(45) Date of Patent: Jul. 5, 2022

(54) SIGNAL EVALUATION OF AN ACCELERATION SENSOR

(71) Applicant: Hirschmann Car Communication GmbH, Neckartenzlingen (DE)

(72) Inventors: Sven Winterholler, Fulda (DE); Philip Hartmann, Fulda (DE); Sebastian Mannz, Fulda (DE)

(73) Assignee: Hirschmann Car Communication GmbH, Neckartenzlingen (DE)

( * ) Notice: Subject to any disclaimer, the term of this patent is extended or adjusted under 35 U.S.C. 154(b) by 125 days.

(21) Appl. No.: 16/423,722

(22) Filed: May 28, 2019

(65) Prior Publication Data

US 2019/0383617 A1   Dec. 19, 2019

Related U.S. Application Data

(63) Continuation of application No. PCT/EP2017/080633, filed on Nov. 28, 2017.

(30) Foreign Application Priority Data

Nov. 28, 2016  (DE) .................... 10 2016 122 912.1
Dec. 2, 2016   (DE) .................... 10 2016 123 327.7

(51) Int. Cl.
 *G01C 21/16*   (2006.01)
 *G06Q 10/08*   (2012.01)
 *G01P 15/02*   (2013.01)

(52) U.S. Cl.
 CPC ......... *G01C 21/16* (2013.01); *G06Q 10/0833* (2013.01); *G01P 15/02* (2013.01)

(58) Field of Classification Search
 CPC ................................. G01C 21/16; G01P 15/02
 See application file for complete search history.

(56) References Cited

U.S. PATENT DOCUMENTS

2002/0177476 A1*  11/2002  Chou ................... G01S 5/0027
                                                            455/574
2003/0163287 A1*  8/2003  Vock .................... A61B 5/1118
                                                            702/187

(Continued)

FOREIGN PATENT DOCUMENTS

CN    201259540 Y    6/2009
JP    2008113366 A   5/2008
JP    2009145980 A   7/2009

(Continued)

OTHER PUBLICATIONS

PCT Search Report and Written Opinion, Application No. PCT/EP2017/080633, dated Apr. 3, 2018, 12 pages.

(Continued)

*Primary Examiner* — Jamel E Williams
(74) *Attorney, Agent, or Firm* — Barley Snyder

(57) ABSTRACT

A device for tracking a mobile article comprises a navigation system adapted to track a movement of the mobile article, a power source adapted to power the navigation system, an acceleration sensor, and a computation unit receiving an output signal from the acceleration sensor. The computation unit determines whether the mobile article is at a standstill or moving based on the output signal and initiates a sleep mode if the output signal has not changed for a specifiable time.

18 Claims, 1 Drawing Sheet

(56) References Cited

U.S. PATENT DOCUMENTS

2014/0067313 A1* 3/2014 Breed .................. G01P 15/02
702/141
2015/0095255 A1* 4/2015 Hall .................. G06Q 10/0833
705/333

FOREIGN PATENT DOCUMENTS

JP    201452870 A    3/2014
JP    2015100142 A    5/2015

OTHER PUBLICATIONS

Abstract of CN 201259540(Y), dated Jun. 17, 2009, 1 page.
Abstract of JP 2015100142(A), dated May 28, 2015, 1 page.
1st Office Action from the Japanese Patent Office and English translation thereof, dated Sep. 1, 2020, 7 pages.
Abstract of JP 2014052870(A), dated Mar. 20, 2014, 1 page.
Abstract of JP 2008113366(A), dated May 15, 2008, 1 page.
Abstract of JP 2009145980(A), dated Jul. 2, 2009, 1 page.

* cited by examiner

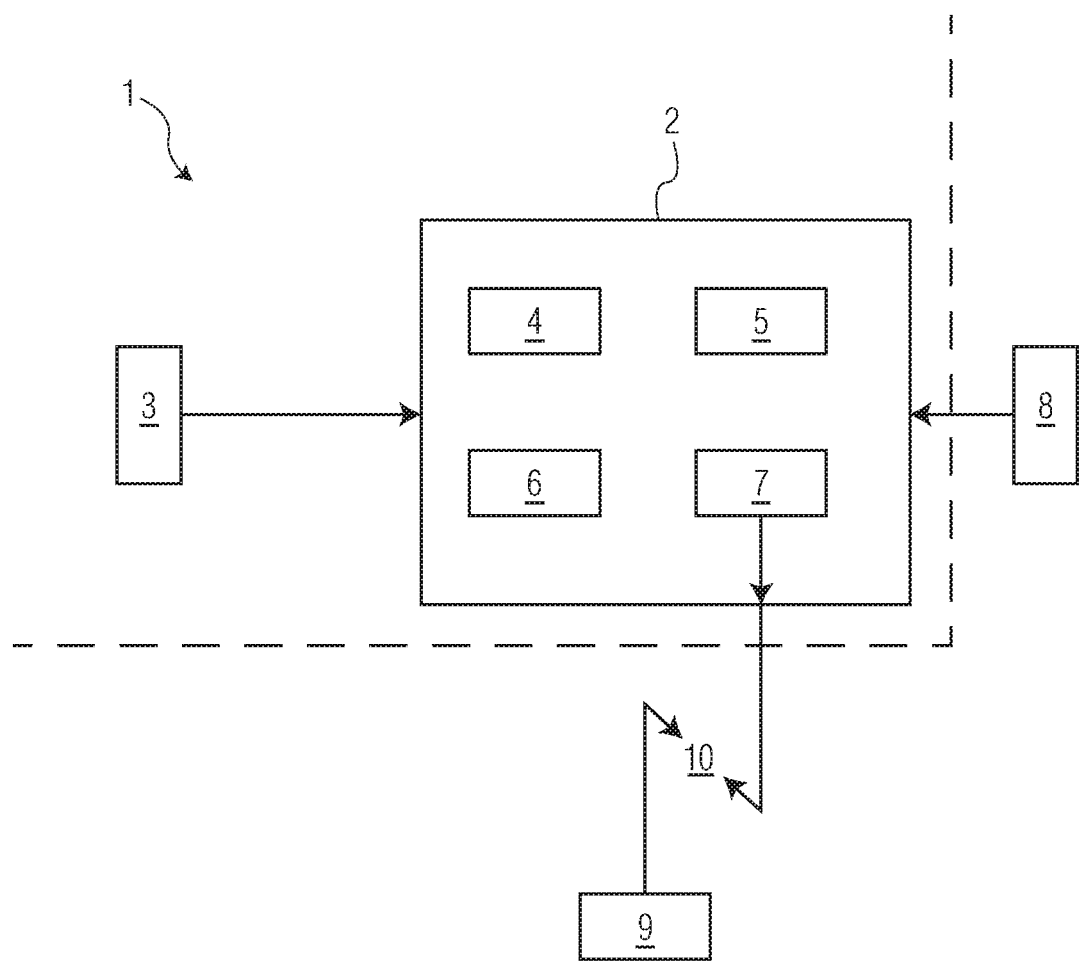

SIGNAL EVALUATION OF AN ACCELERATION SENSOR

CROSS-REFERENCE TO RELATED APPLICATIONS

This application is a continuation of PCT International Application No. PCT/EP2017/080633, filed on Nov. 28, 2017, which claims priority under 35 U.S.C. § 119 to German Patent Application No. 102016122912.1, filed on Nov. 28, 2016, and German Patent Application No. 102016123327.7, filed on Dec. 2, 2016.

FIELD OF THE INVENTION

The present invention relates to a device with an acceleration sensor and, more particularly, to a device with an acceleration sensor for tracking a movement of a mobile article.

BACKGROUND

Mobile articles, such as containers including standard containers for goods transport, refrigerated containers, and the like, are transported for goods transport on ships, vehicles, aircraft, railway, and the like. For the operators of such containers, such as logistics companies, it is important to know the current position of the container. Navigation systems can be used to detect the movement of the container. For this purpose, a GPS module, for example, is attached to the container. The GPS module produces a connection to satellites and detects the position of the container and position changes during transport, loading, or the like.

The GPS module must be operated by a stationary energy source, such as a battery, because in the harsh environment in which such containers are moved, other energy sources such as solar cells are not an option. Further, if solar cells are used, the energy from these is often not able to permanently supply the device with sufficient power, since it is not always guaranteed that the solar cells supply enough energy on account of insufficient sunshine. On the other hand, the container may be stationary for a relatively long time, for example during transport on a ship, and thus does not change its position, yet the GPS module nevertheless consumes power during this time.

SUMMARY

A device for tracking a mobile article comprises a navigation system adapted to track a movement of the mobile article, a power source adapted to power the navigation system, an acceleration sensor, and a computation unit receiving an output signal from the acceleration sensor. The computation unit determines whether the mobile article is at a standstill or moving based on the output signal and initiates a sleep mode if the output signal has not changed for a specifiable time.

BRIEF DESCRIPTION OF THE DRAWINGS

The invention will now be described by way of example with reference to the accompanying FIGURE, of which:

The FIGURE is a block diagram of a device for tracking a mobile article according to an embodiment of the invention.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will convey the concept of the disclosure to those skilled in the art.

The term "navigation system" used hereafter represents the function of a satellite-supported position-determining system. The Global Positioning System (GPS) module is an embodiment in general of a Global Navigation Satellite System (GNSS) module, since GPS is a sub-variant of GNSS.

A device 1 according to an embodiment of the invention for tracking a mobile article is shown in the FIGURE. In an embodiment, the mobile article is a container, such as a heavy-goods vehicle trailer or the like. In other embodiments, the mobile article may be any type of mobile article used for transport.

The device 1, which is depicted on the left of and above the dashed line in the FIGURE, comprises a control unit 2 to which an acceleration sensor 3 is attached. In other embodiments, more than one acceleration sensor 3 can be attached to the control unit 2, in particular for the purposes of redundancy. The acceleration sensor 3 is arranged in the device 1, in particular in a housing of the device 1. In an embodiment, the housing of the device 1 is permanently or releasably fastened to the mobile article.

As shown in the FIGURE, a computation unit 4 with an evaluation logic, a navigation system 5, a power source 6, and a transmission device 7 are integrated in the control unit 2. In an embodiment, the computation unit 4 includes processor and a memory storing instructions that are executable by the processor to perform the evaluation logic. The memory is a non-transitory computer readable medium.

In an embodiment, a temperature sensor 8 can be connected to the control unit 2. With the temperature sensor 8, the temperature can be detected and can be taken into account or transmitted as described below. In the shown embodiment, the sensor 8 is arranged outside the device 1 and attached to the device 1. In other embodiments, the sensor 8 can be arranged inside the device 1, in a housing of the device 1.

The transmission device 7, which is a modem in an embodiment, is suitable and configured for transmitting data of the navigation system 5 to a central server 9 via a transmission path 10 shown in the FIGURE. In an embodiment, the transmission path 10 is via a radio.

The movement of the mobile article is tracked by the navigation system 5, the navigation system 5 being connected to the power source 6 during this tracking. With the navigation system 5, the actual transport of the container can be tracked, when it is transported by heavy-goods vehicle, ship, aircraft or some other way, for example.

The power source 6 consumes power for detecting the position and possibly also for displaying or forwarding of the detected position. It is also possible to identify the position of the mobile article with the navigation system 5 when it is at a standstill. However, for this purpose, also in the case of the standstill of the article, it is necessary for the navigation system 5 to be supplied with energy, a large amount of energy being required in order to determine the position via satellites and to transmit the location by radio along the transmission path 10, which energy often cannot be made available permanently by a stationary power source. If the mobile article is not moving for a certain time, which is generally not known in advance, it is unnecessary to track its movement, such that the navigation system 5 can then be switched off.

Using the data of the navigation system 5, the position of the mobile article, at which the device 1 is arranged, can be tracked if the relevant elements of the device 1, in particular the navigation system 5, are not in a sleep mode determined by the computation unit 4. If the relevant elements are in sleep mode, in particular the navigation system 5 but possibly also parts of the computation unit 4 and/or of the transmission device 7, the position of the mobile article is not tracked, since it is assumed that it is at a complete standstill or is not moving significantly and thus power can be saved.

When the device 1 is in sleep mode, the navigation system 5 is disconnected from the power source 6 and no data exchange takes place between the device 1 and the central server 9 via the transmission path 10. The acceleration sensor 3 and the computation unit 4 are supplied with power during the sleep mode, since the acceleration sensor 3 identifies whether the article is beginning to move again. It is not until a significant movement of the mobile article has been identified by the acceleration sensor 3 that the device 1 is "woken up" from the sleep mode, so that, with the navigation system 5, the position of the mobile article is detected and tracked, and this data of the movement is transmitted to the central server 9 via the transmission path 10 by the transmission device 7.

In an embodiment, a standstill state or a movement of the mobile article is detected by the navigation system 5. The navigation system 5 may identify that, for a specified period, no movement has taken place and the device 1 is placed in the sleep mode.

In another embodiment, a standstill state or a movement of the mobile article is detected by the acceleration sensor 3. The acceleration sensor 3 detects whether the mobile article is moved or not based on a change in the speed at which the article is moved. An output signal of the acceleration sensor 3 is delivered to the computation unit 4, wherein, depending on the output signal, it is detected whether the article is at a standstill or moving using the evaluation logic. The acceleration sensor 3 supplies a first output signal if the article is moving and supplies a second output signal different from the first output signal if the mobile article is at a standstill. These different output signals of the acceleration sensor 3 can be detected and evaluated at the computation unit 4. If the evaluation logic reveals that an output signal representing the movement of the article is present, sleep mode is not yet activated. However, if it is revealed that the output signal representing the standstill of the article is present, sleep mode is activated. In an embodiment, if it is identified that the output signal of the acceleration sensor 3 does not change for a specifiable time stored in the memory of the computation unit 4, the computation unit 4 determines that the article is not moving, wherein in such a case the sleep mode is initiated. In an embodiment, the specifiable time is one minute. In other embodiments, the specifiable time can be on the order of seconds or longer than one minute.

If the change in movement lies below a specifiable threshold acceleration value stored in the memory of the computation unit 4, the evaluation logic determines that the mobile article is at a standstill and the relevant elements of the device 1 remain in the sleep mode. Relatively small accelerations, such as impacts for example, which lead to a minimal movement of the article, are not intended to lead to a deactivation of sleep mode.

In an exemplary embodiment, a container is at a standstill, for example, in the loading area underneath a container crane by which the container is intended to be loaded onto a ship. During the time in which the container is at a standstill, such as for a few minutes, the output signal of the acceleration sensor 3 signals that the container is at a standstill. If, for example, an evaluation of the sensor signal takes place every minute and no change is identified, the entire system is shifted into sleep mode by the computation unit 4. If, however, thereafter during a monitoring period of one minute, for example, the computation unit 4 identifies that the output signal of the acceleration sensor 3 changes, the entire system is switched on, since it is to be assumed from this that the container has been picked up and moved by the loading crane. During this time, it is necessary to monitor the further movement of the container at least by the acceleration sensor 3.

Subsequently, the container is picked up by the container crane and the container crane is moved into a loading space of a container freighter, where the container is parked at its intended location. During this time, the device 1 attached to the container is active. However, if the container is at its intended location and it is identified, by way of the output signal of the acceleration sensor 3 within the identification period, which is one minute in an embodiment, that the output signal of the acceleration sensor 3 does not change, the device 1 is shifted into sleep mode by the computation unit 4.

If a container is situated on board a ship, for example, the threshold acceleration value is defined in such a way that, for example, minimal movements of the container as a result of swell do not lead to a deactivation of sleep mode, although the container freighter itself is moving. This is because, during the crossing of the container on a container freighter from the departure port to its destination port, it is not necessary to follow the movement of the container. During this time, the device 1 is in its sleep mode in order to save energy. However, every minute for example, the output signal of the acceleration sensor 3 continues to be reviewed by the computation unit 4 and checked to see if this has changed. As long as no change is identified, the entire device 1 remains in sleep mode.

It is not until the container is picked up by a container crane, for example, and set down on a trailer for further transport that the threshold value for the acceleration can be defined in such a way that the computation unit 4 deactivates the sleep mode and the device 1 is "woken up." The change in the output signal of the acceleration sensor 3 is detected again, and the entire device 1 is shifted from sleep mode into active mode. If the container is transported further on the trailer of a heavy-goods vehicle, it is assumed that the position of the container is intended to be further tracked and sleep mode is thus deactivated. The threshold acceleration value can, however, be selected in such a way that, considered over time, for example, red traffic-light phases, during which the heavy-goods vehicle is stationary, are considered to be a standstill phase, and the device (or the relevant parts thereof) during this, albeit short, time is switched into sleep mode.

The device 1 can communicate with the central server 9 from outside and over a large distance, for example, in order to undertake or change a configuration of the device 1. In an embodiment, the communication with the central server 9 can be used to reprogram the computation unit 4, to review the charging status or the voltage of the power source 6, for example, in order to adjust or to change the specifiable threshold acceleration value stored in the memory of the computation unit 4. The device 1 can also be brought into sleep mode via a remote access, if it has not been in sleep mode beforehand, or vice versa.

In another embodiment, the device 1 is integrated into a module with the aid of which, and with the aid of satellite navigation, the position of the container can be detected and tracked at any time. In this embodiment, the route of the container can be tracked and likewise can be transmitted to the central server 9.

What is claimed is:

1. A method for tracking a mobile article, comprising:
   arranging a device at the mobile article, the device including a navigation system adapted to track a movement of the mobile article, a power source adapted to power the navigation system, an acceleration sensor, and a computation unit;
   delivering an output signal of the acceleration sensor to the computation unit;
   determining at the computation unit whether the mobile article is at a standstill or moving based on the output signal; and
   initiating a sleep mode with the computation unit if the output signal has not changed for a specifiable time.

2. The method of claim 1, wherein the navigation system is disconnected from the power source during the sleep mode.

3. The method of claim 2, further comprising ending the sleep mode and connecting the navigation system to the power source when the computation unit determines that the output signal has changed and the mobile article is moving.

4. The method of claim 3, wherein the computation unit determines that the output signal has changed and the mobile article is moving by comparison of a change in the output signal to a specifiable threshold acceleration value.

5. The method of claim 3, further comprising transmitting a data of the navigation system to a central server.

6. The method of claim 5, wherein the transmission of the data is switched off during the sleep mode.

7. The method of claim 6, wherein the transmission of the data is via a radio.

8. The method of claim 1, wherein the mobile article is a container for goods transport.

9. A device for tracking a mobile article, comprising:
   a navigation system adapted to track a movement of the mobile article;
   a power source adapted to power the navigation system;
   an acceleration sensor; and
   a computation unit receiving an output signal from the acceleration sensor, the computation unit determines whether the mobile article is at a standstill or moving based on the output signal and initiates a sleep mode if the output signal has not changed for a specifiable time.

10. The device of claim 9, further comprising a transmission device connected to the navigation system and transmitting a data of the navigation system to a central server.

11. The device of claim 10, wherein the transmission device receives signals transmitted from the central server.

12. The device of claim 10, wherein the navigation system is disconnected from the power source during the sleep mode.

13. The device of claim 12, wherein the transmission of the data with the transmission device is switched off during the sleep mode.

14. The device of claim 13, wherein the computation unit ends the sleep mode and connects the navigation system to the power source when the computation unit determines that the output signal has changed and the mobile article is moving.

15. The device of claim 14, wherein the computation unit determines that the output signal has changed and the mobile article is moving by comparison of a change in the output signal to a specifiable threshold acceleration value.

16. The device of claim 9, wherein the mobile article is a container for goods transport.

17. The method of claim 4, wherein the specifiable threshold acceleration value is greater than zero.

18. The device of claim 15, wherein the specifiable threshold acceleration value is greater than zero.

\* \* \* \* \*